US012474098B2

(12) United States Patent
Feng et al.

(10) Patent No.: US 12,474,098 B2
(45) Date of Patent: Nov. 18, 2025

(54) LIQUID ACCUMULATOR AND REFRIGERATING SYSTEM HAVING SAME

(71) Applicant: ZHEJIANG DUNAN ARTIFICIAL ENVIRONMENT CO., LTD., Shaoxing (CN)

(72) Inventors: Zhongbo Feng, Shaoxing (CN); Yankai Ge, Shaoxing (CN); Pengfei Liao, Shaoxing (CN); Wenzheng Liu, Shaoxing (CN); Yuhang Li, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 185 days.

(21) Appl. No.: 18/225,105

(22) Filed: Jul. 22, 2023

(65) Prior Publication Data
US 2023/0358452 A1    Nov. 9, 2023

Related U.S. Application Data

(63) Continuation of application No. PCT/CN2022/072739, filed on Jan. 19, 2022.

(30) Foreign Application Priority Data

Feb. 10, 2021  (CN) .......................... 202120372464.0

(51) Int. Cl.
F25B 43/00    (2006.01)
F25B 1/00     (2006.01)
F25B 41/20    (2021.01)

(52) U.S. Cl.
CPC ............. *F25B 43/006* (2013.01); *F25B 1/00* (2013.01); *F25B 41/20* (2021.01)

(58) Field of Classification Search
CPC ............... F25B 43/006; F25B 2400/03; F25B 2400/16; F25B 2600/2523;
(Continued)

(56) References Cited

U.S. PATENT DOCUMENTS 2,277,999  A  *  3/1942  Thompson ............ F25B 41/315
                                                  62/512
2,278,001  A  *  3/1942  Thompson ............ F25B 41/315
                                                  62/509

FOREIGN PATENT DOCUMENTS

CN        200972292 Y      11/2007
CN        204084980 U       1/2015
(Continued)

OTHER PUBLICATIONS

International Search Report of PCT/CN2022/072739.

*Primary Examiner* — Miguel A Diaz

(57) ABSTRACT

A liquid accumulator and a refrigerating system having same are provided. The liquid accumulator includes a tank body component, a valve seat, a baffle, and a one-way valve. The tank body component has a tank cavity, and the valve seat and the baffle are arranged in the tank cavity and abut against a side wall of the tank cavity, respectively. The valve seat is provided with a valve port, and the baffle is provided with a communicating port. The one-way valve includes a valve plate, a valve core, and a blocking portion connected to the valve core. The valve plate is arranged at an end of the one-way valve that is proximal to the valve port. The valve plate can block the valve port and abut against the valve core, and an end of the valve core away from the valve plate passes through the communicating port.

10 Claims, 15 Drawing Sheets

(58) Field of Classification Search
CPC .......... F25B 2600/2525; F25B 2600/25; F25B 41/20; F25B 1/00
See application file for complete search history.

(56) References Cited

FOREIGN PATENT DOCUMENTS

| | | |
|---|---|---|
| CN | 208365880 U | 1/2019 |
| CN | 111173712 A | 5/2020 |
| CN | 111237193 A | 6/2020 |
| CN | 212003513 U | 11/2020 |
| CN | 112129016 A | 12/2020 |
| CN | 215063021 U | 12/2021 |
| WO | WO2020257966 A1 | 12/2020 |

* cited by examiner

LIQUID ACCUMULATOR AND REFRIGERATING SYSTEM HAVING SAME

CROSS-REFERENCE TO RELATED APPLICATIONS

This application a continuation of international patent application No. PCT/CN2022/072739, filed on Jan. 19, 2022, which itself claims priority to Chinese patent application No. 202120372464.0, filed on Feb. 10, 2021, titled "LIQUID ACCUMULATOR AND REFRIGERATING SYSTEM HAVING SAME", which is hereby incorporated by reference.

TECHNICAL FIELD

The present disclosure generally relates to a field of refrigerating, and in particular, to a liquid accumulator and a refrigerating system having same.

BACKGROUND

A liquid accumulator is mounted in a refrigerating system to play a role of medium storage, gas-liquid separation, etc. Refrigerant in a conventional liquid accumulator would backflow into an inlet pipe, resulting in insufficient supply of refrigerant in a compressor, thus causing the compressor to take a longer time to start, affecting efficiency of the refrigerating system.

SUMMARY

According to various embodiments of the present disclosure, a liquid accumulator is provided to solve the above problem.

The liquid accumulator includes a tank body component, a valve seat, a baffle, and a one-way valve. The tank body component has a tank cavity, and the valve seat and the baffle are arranged in the tank cavity and abut against a side wall of the tank cavity, respectively. The valve seat is provided with a valve port, and the baffle is provided with a communicating port. The one-way valve comprises a valve plate, a valve core, and a blocking portion connected to the valve core. The valve plate is arranged at an end of the one-way valve that is proximal to the valve port, the valve plate is capable of blocking the valve port, the valve plate abuts against the valve core, and an end of the valve core away from the valve plate passes through the communicating port. A first end of the blocking portion abuts against a side surface of the valve plate that is away from the baffle and enables the valve core to connect to the valve plate, and a second end of the blocking portion either abuts against a side surface of the baffle that is away from the valve seat or penetrates through the valve core and abuts against an end surface of the valve core that is away from the valve plate.

In this way, a first end of the valve core is connected to the valve plate, and a second end of the valve core abuts against the baffle, or the whole valve core is fixed to the valve plate, which may strengthen coaxiality of the one-way valve, the valve port, and the communicating port, avoid the one-way valve to tilt and leakage. The communicating port is configured to guide a movement of the valve core.

In some embodiments, the blocking portion includes a first fastening member and a second fastening member. A first end of the first fastening member abuts against the valve plate, and a second end of the first fastening member extends into the valve core and is connected to the valve core. A first end of the second fastening member abuts against an end surface of the valve core that is away from the first fastening member, and a second end of the second fastening member extends into the valve core and abuts against the first fastening member.

In this way, the blocking portion may strengthen connecting solidity between the valve core and the valve plate. The first fastening member and the second fastening member may increase a torque after mounting in the one-way valve, further strengthening moving stability of the valve core.

In some embodiments, the first fastening member includes a first screw, and the first screw is threadedably connected to the valve core; or, the first fastening member includes a first rivet, and the first rivet is riveted in the valve core. The second fastening member includes a second screw, and the second screw is threadedably connected to the valve core; or, the second fastening member includes a second rivet, and the second rivet is riveted in the valve core.

In this way, the blocking portion has a simple structure and a low cost.

In some embodiments, the blocking portion includes a first fastening member and a blocking member, the first fastening member penetrates through the valve core and extends out of the valve core, the blocking member is disposed on an end surface of the valve core that is away from the first fastening member, and the blocking member is connected to the first fastening member.

In some embodiments, the blocking member includes a nut or a pin.

In this way, the blocking member has a simple structure and a low cost. The nut and the pin may adjust the torque and strengthen the connecting solidity between the valve core and the valve plate.

In some embodiments, the blocking portion includes a connecting section and a bending section connected with each other, a first end of the connecting section abuts against the valve plate, a second end of the connecting section extends into the valve core and is connected to the valve core, and the bending section abuts against an end surface of the valve core that is away from the connecting section.

In some embodiments, the blocking portion includes a first fastening member and a convex member. A first end of the first fastening member abuts against the side surface of the valve plate that is away from the baffle, and a second end of the first fastening member extends into the valve core and is connected to the valve core. The convex member is disposed on an end of the valve core that is away from the first fastening member, and the convex member abuts against the baffle.

In this way, the valve core may abut against the baffle to strengthen stability of the valve core, thus strengthening coaxiality of the valve core, the valve port, and the communicating port.

In some embodiments, a side surface of the valve seat is provided with a first protrusion, the side surface of the valve seat is proximal to the valve core, the first protrusion is proximal to and around the valve port, and the first protrusion abuts against the valve plate.

In some embodiments, the baffle is provided with a guide portion proximal to the valve core, the guide portion extends along an axial direction of the liquid accumulator, the communicating port is disposed on the guide portion, and the one-way valve is capable of moving along an axial direction of the guide portion to open or close the valve port.

In this way, the guide portion may guide the movement of the valve core.

The present disclosure further provides a refrigerating system.

The refrigerating system includes the above liquid accumulator.

Compared with the related art, the liquid accumulator provided in the present disclosure may strengthen the stability of the valve core and strengthen coaxiality of the valve core, the valve port, and the communicating port by disposing the blocking portion. The first end of the blocking portion abuts against the valve plate, and the second end of the blocking portion either penetrates through the valve core and abuts against an end of the valve core that is away from the valve plate or abuts against the baffle.

Figure 1:
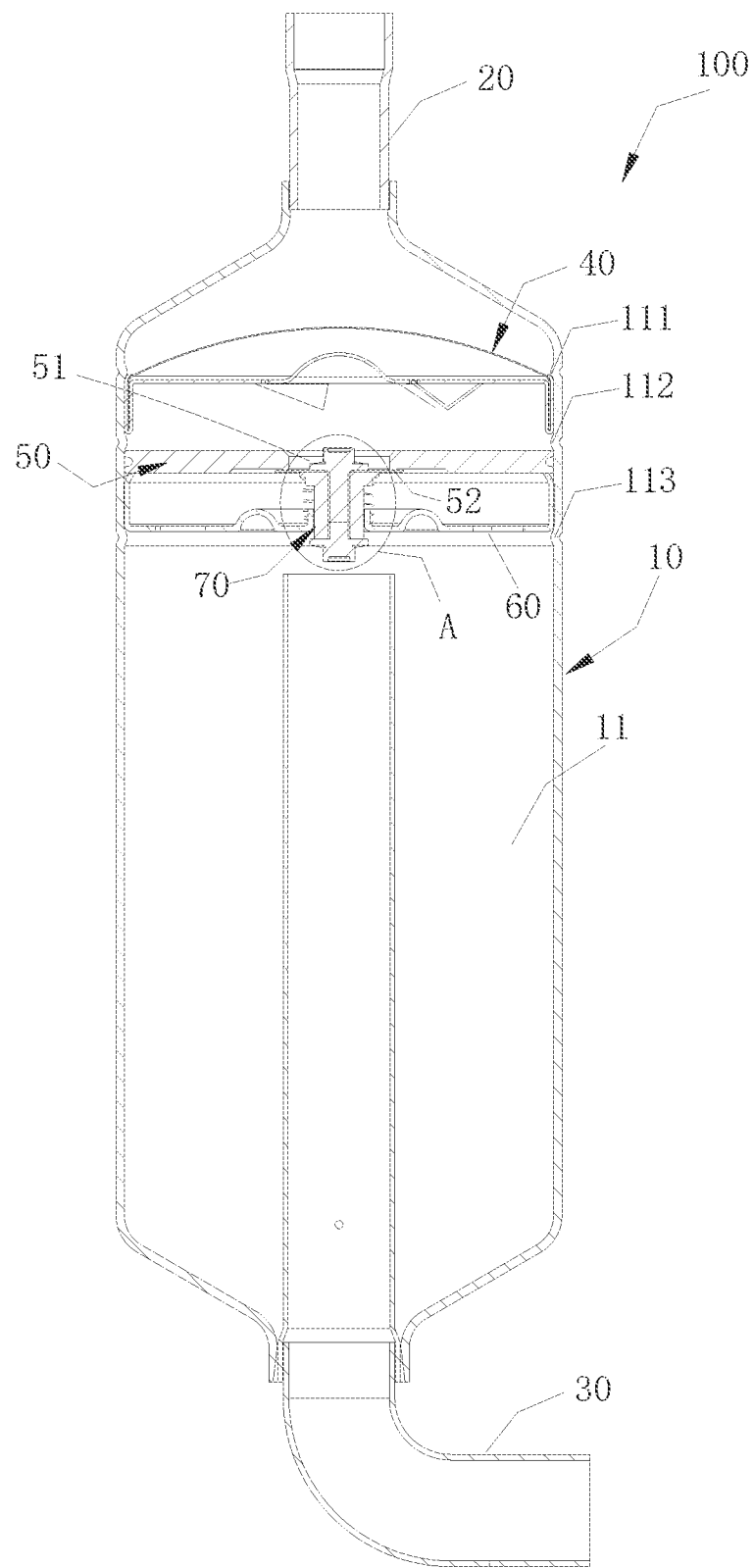
FIG. 1 is a schematic diagram of a liquid accumulator in a first embodiment of the present disclosure.

In the figures, 100 represents a liquid accumulator, 200 represents a refrigerating system, 10 represents a tank body component, 11 represents a tank cavity, 111 represents a fourth protrusion, 112 represents a second protrusion, 113 represents a third protrusion, 20 represents an inlet pipe, 30 represents an outlet pipe, 40 represents a screen component, 50 represents a valve seat, 51 represents a valve port, 52 represents a first protrusion, 60 represents a baffle, 61 represents a communicating port, 62 represents a guide portion, 70 represents a one-way valve, 71 represents a valve plate, 72 represents a valve core, 73 represents an elastic member, 74 represents a blocking portion, 741 represents a first fastening member, 742 represents a second fastening member, 743 represents a blocking member, 7431 represents a nut, 7432 represents a pin, 744 represents a connecting section, 745 represents a bending section, and 746 represents a convex member.

DETAILED DESCRIPTION OF THE EMBODIMENT

The technical solutions in the embodiments of the present disclosure will be clearly and completely described below in conjunction with the accompanying drawings in the embodiments of the present disclosure, and it is clear that the embodiments described are only a portion of the embodiments of the present disclosure, and not all of them. Based on the embodiments in the present disclosure, all other embodiments obtained by a person of ordinary skill in the art without making creative labor fall within the scope of protection of the present disclosure.

It should be noted that when a component is considered to be "arranged on" another component, it can be directly arranged on another component, or there can be a centered component. When a component is considered to be "disposed on" another component, it can be directly disposed on another component, or there can be a centered component. When a component is considered to be "fixed to" another component, it can be directly fixed to another component, or there can be a centered component.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

Referring to FIG. 1 to FIG. 14, a liquid accumulator 100 provided in the present may include a tank body component 10, an inlet pipe 20, and an outlet pipe 30. The tank body component 10 has a tank cavity 11, ends of the tank body component 10 are provided with an inlet and an outlet, respectively, the inlet pipe 20 may penetrate through the inlet and be fixed to the tank body component 10, the outlet pipe 30 may penetrate through the outlet and be fixed to the tank body component 10, a first end of the outlet pipe 30 is disposed in the tank cavity 11, and a second end of the outlet pipe 30 may extend out from the tank cavity 11.

The liquid accumulator 100 may further include a screen component 40 disposed in the tank cavity 11, and the screen component 40 is fixed to a side wall of the tank cavity 11.

The liquid accumulator 100 further includes a valve seat 50 and a baffle 60. The valve seat 50 is located between the baffle 60 and the screen component 40. The valve seat 50 and the baffle 60 are fixedly connected to the side wall of the tank cavity 11, respectively. The screen component 40, the valve seat 50, and the baffle 60 are located between the inlet pipe 20 and the outlet pipe 30.

The side wall of the tank cavity 11 is provided with a fourth protrusion 111, a second protrusion 112, and a third protrusion 113. A first end of the screen component 40 may abut against the fourth protrusion 111, and a second end of the screen component 40 may abut against the second protrusion 112. A first end of the valve seat 50 may abut against the second protrusion 112, and a second end of the valve seat 50 may abut against the baffle 60. A first end of the baffle 60 may abut against the valve seat 50, and a second end of the baffle 60 may abut against the third protrusion 113. In the present embodiment, the fourth protrusion 111, the second protrusion 112, and the third protrusion 113 are all formed by applying pressure on an outer wall of the tank body component 10. In other embodiments, the fourth protrusion 111, the second protrusion 112, and the third protrusion 113 may be provided on an inner wall of the tank cavity 11.

The valve seat 50 is provided with a valve port 51, the baffle 60 is provided with a communicating port 61, and the valve port 51 and the communicating port 61 may be arranged coaxially.

The liquid accumulator 100 further includes a one-way valve 70, and the one-way valve 70 may penetrate through the valve port 51 and extend to the communicating port 61. The one-way valve 70 may move in the valve port 51 and the communicating port 61 along an axial direction of the tank body component 10, to open the valve port 51 one-way and prevent backflow of refrigerant into the inlet pipe 20. The communicating port 61 may guide a movement of the one-way valve 70.

The one-way valve 70 includes a valve plate 71 and a valve core 72. The valve plate 71 is capable of blocking the valve port 51 or unblocking the valve port 51. The valve plate 71 abuts against the valve core 72.

An end of the valve seat 50 is provided with a first protrusion 52, the end of the valve seat 50 may be proximal to the valve core 71, and the first protrusion 52 may abut against the valve plate 71 to strengthen sealing between the valve seat 50 and the valve core 71.

The one-way valve 70 may further include an elastic member 73, a first end of the elastic member 73 may abut against the valve core 72, a second end of the elastic member 73 may abut against the baffle 60, and the elastic member 73 is configured to reset the one-way valve 70.

The one-way valve 70 further includes a blocking portion 74. A first end of the blocking portion 74 abuts against a side surface of the valve plate 74 that is away from the baffle 60 and enables the valve core 72 to connect to the valve plate 71, and a second end of the blocking portion 74 either abuts against a side surface of the baffle 60 that is away from the valve seat 50 or penetrates through the valve core 72 and abuts against an end surface of the valve core 72 that is away from the valve plate 71. In this way, a first end of the valve core 72 of the one-way valve 70 is connected to the valve plate 71, and a second end of the valve core 72 may abut against the baffle 60, or the whole valve core 72 is fixed to the valve plate 71, which may strengthen coaxiality of the one-way valve 70, the valve port 51, and the communicating port 61.

The baffle 60 is provided with a guide portion 62 proximal to the valve core 72, the guide portion 62 may extend along an axial direction of the liquid accumulator 100, the communicating port 61 is disposed on the guide portion 62, and the one-way valve 70 is capable of moving along an axial direction of the guide portion 62 to open or close the valve port 51. The guide portion 62 may guide a movement of the valve core 72.

Alternatively, the guide portion 62 may extend along an axial direction of the valve seat 50 and facing the valve seat 50. In other embodiments, the guide portion 62 may extend along an axial direction of the valve seat 50 and away from the valve seat 50, or the guide portion 62 may extend along the baffle 60 facing the valve seat 50 and away from the valve seat 50.

A First Embodiment

Figure 2:
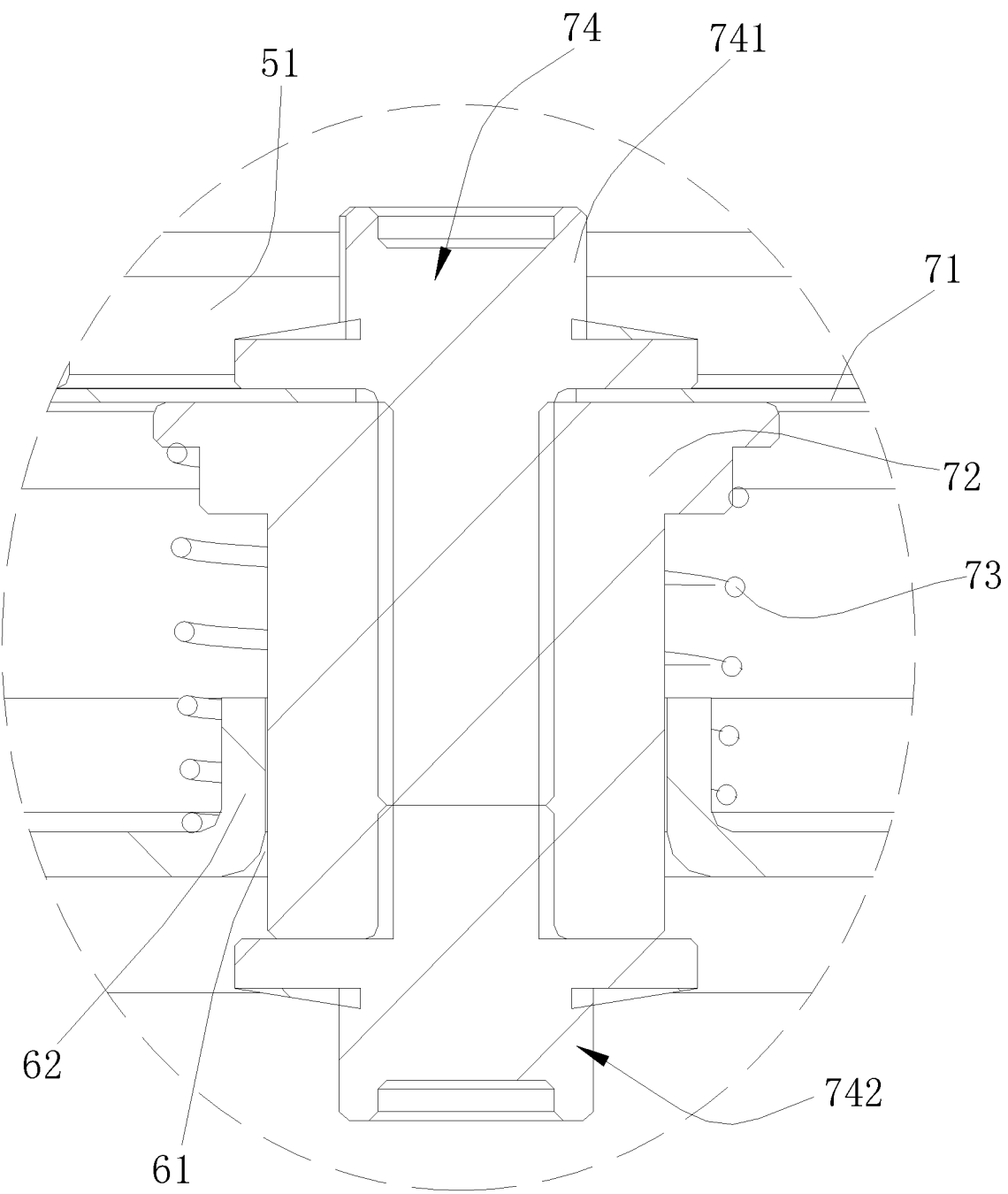
FIG. 2 is an enlargement diagram of portion "A" of FIG. 1.

Referring to FIG. 1 and FIG. 2, the blocking portion 74 may include a first fastening member 741 and a second fastening member 742. A first end of the first fastening member 741 may abut against the valve plate 71, and a second end of the first fastening member 741 may extend into the valve core 72 and be connected to the valve core 72. A second end of the second fastening member 742 may abut against an end surface of the valve core 72 that is away from the first fastening member 741, and a second end of the second fastening member 742 may extend into the valve core 72 and be connected to the valve core 72. The first fastening member 741 may abut against the second fastening member 742.

The first fastening member 741 may include a first screw, and the first screw is threadedably connected to the valve core 72. The valve core 72 is connected to the valve plate 71 by the first screw. The second fastening member 742 may include a second screw, and the second screw is threadedably connected to the valve core 72. In this way, the first fastening member 741 and the second fastening member 742 have a simple structure and a low cost, and may adjust a torque to facilitate using.

Figure 13:
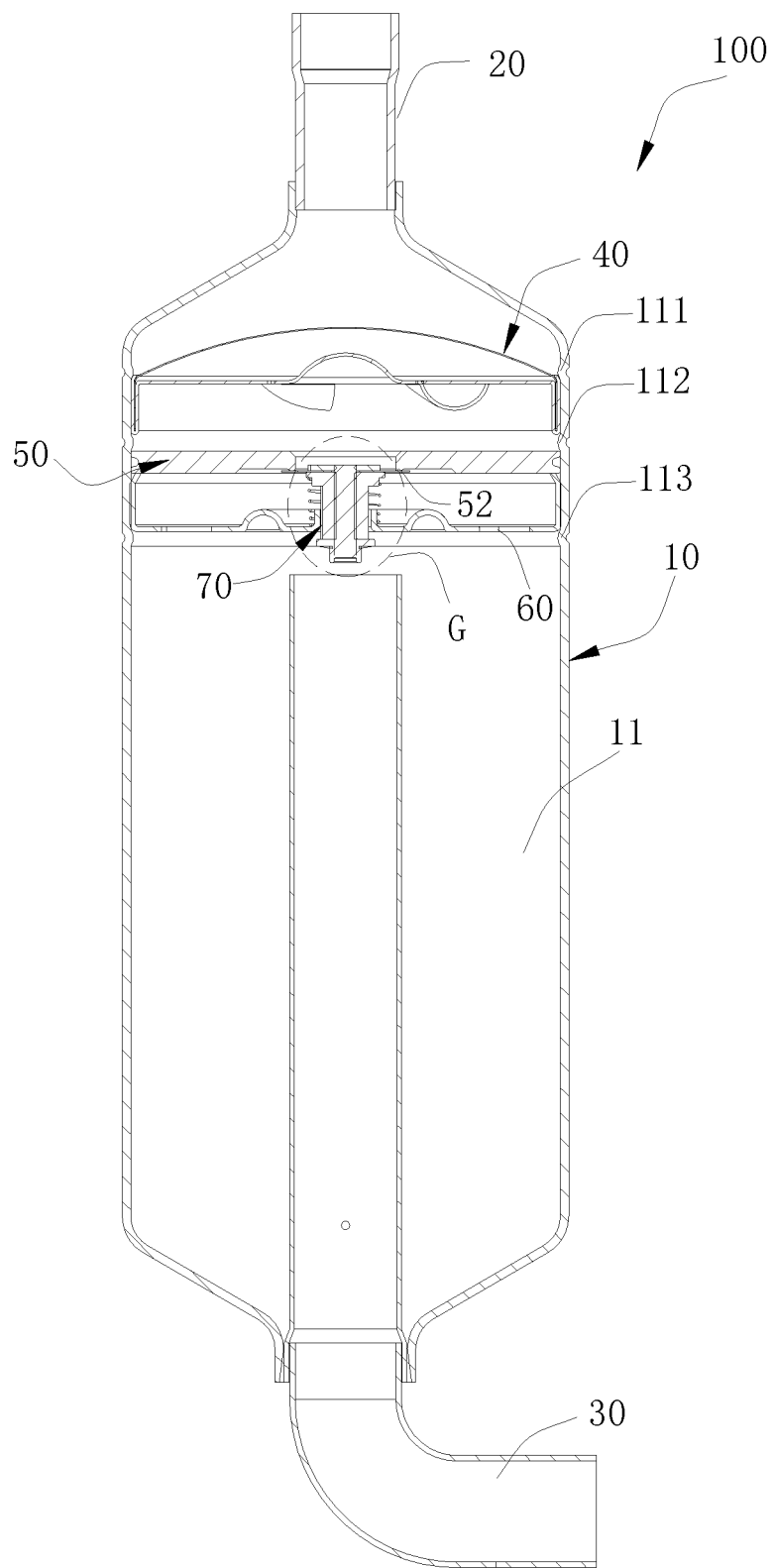
FIG. 13 is a schematic diagram of a liquid accumulator in a seventh embodiment of the present disclosure.
Figure 14:
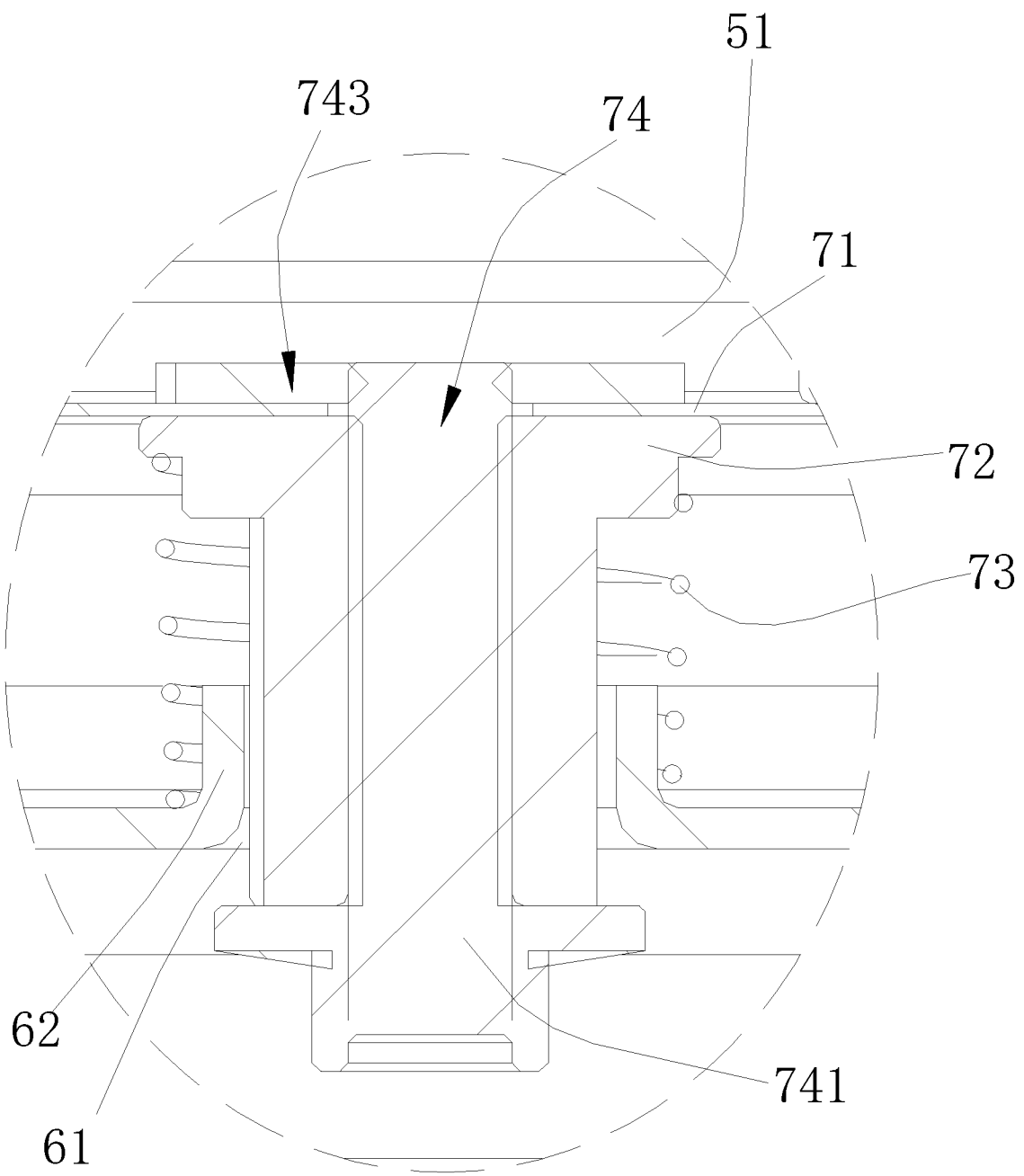
FIG. 14 is an enlargement diagram of portion "G" of FIG. 13.

In the present embodiment, the first fastening member 741 may be proximal to the valve seat 50, and the first fastening member 741 may abut against the valve plate 71. The second fastening member 742 may be proximal to the baffle 60, and the second fastening member 742 may abut against the end surface of the valve core 72 that is away from the valve plate 71. Referring to FIG. 13 and FIG. 14, in other embodiments, the first fastening member 741 may be away from the valve seat 50, and the first fastening member 741 may abut against the end surface of the valve core 72 that is away from the valve plate 71. The second fastening member 742 may be away from the baffle 60, and the second fastening member 742 may abut against the valve plate 71.

After mounting of the valve seat 50, the one-way valve 70, and the baffle 60 is completed, the second fastening member 742 may be rotated to increase a torque greater than or equal to 2.5 Nm to fix the valve core 72.

A Second Embodiment

Figure 3:
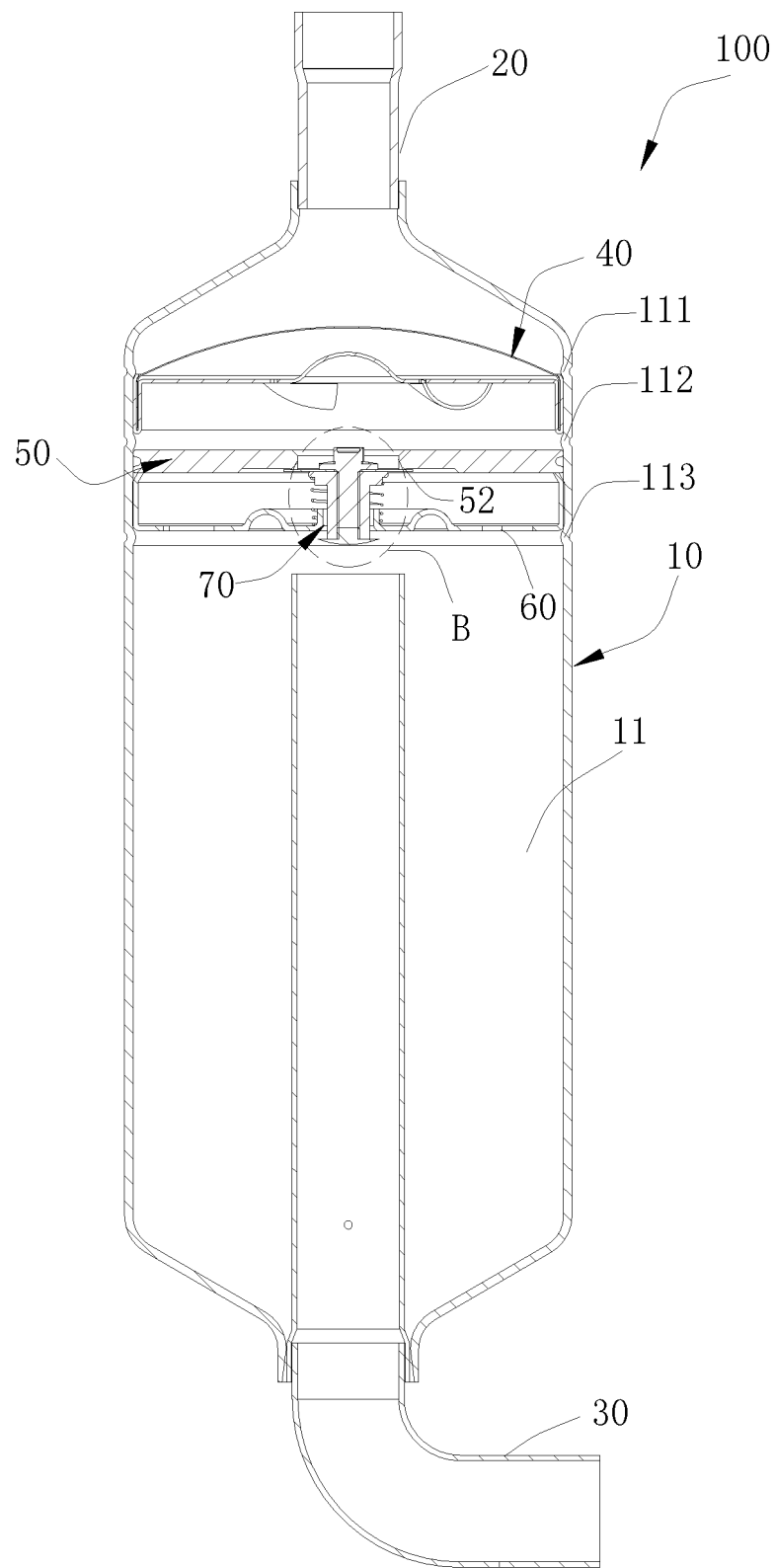
FIG. 3 is a schematic diagram of a liquid accumulator in a second embodiment of the present disclosure.
Figure 4:
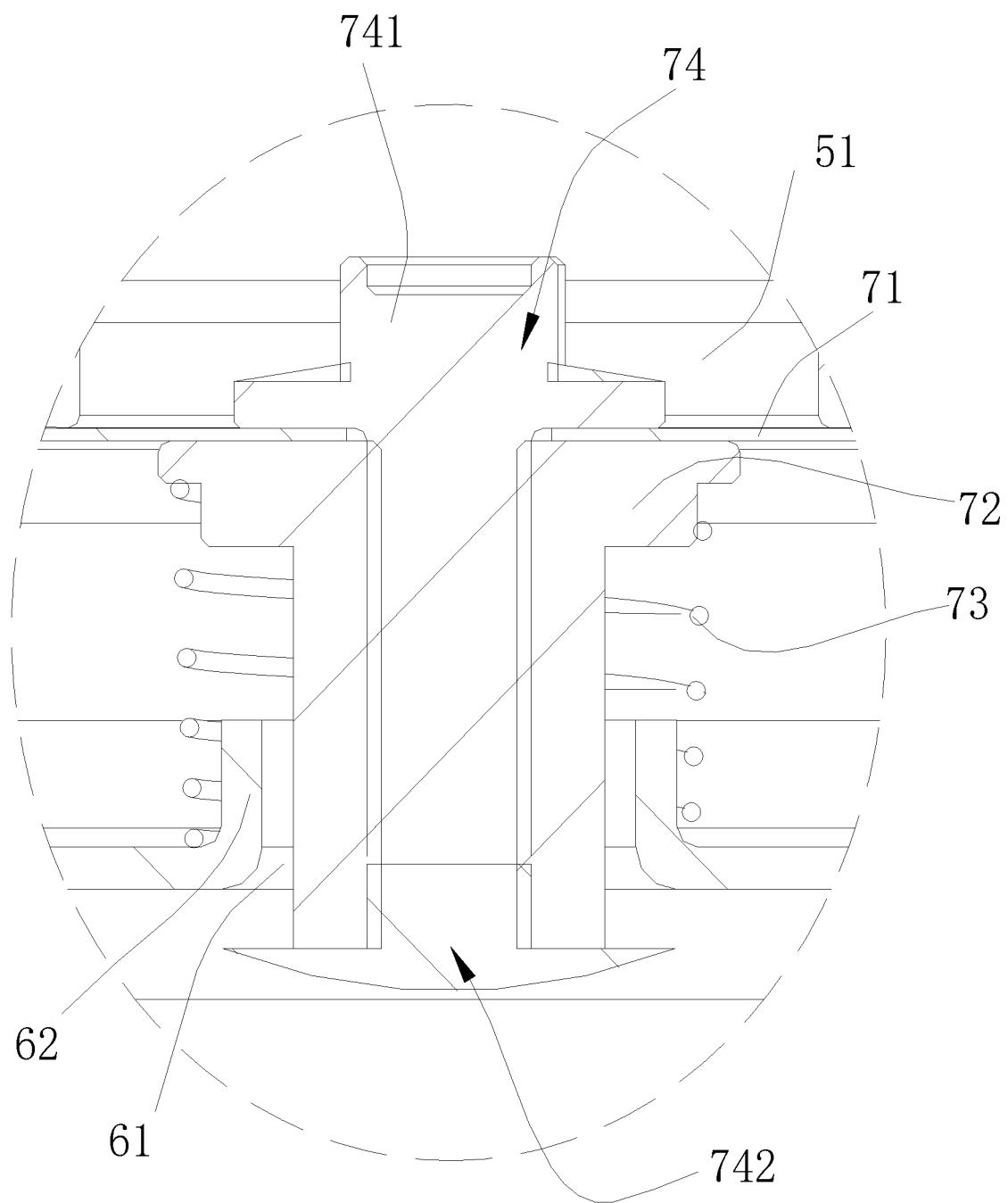
FIG. 4 is an enlargement diagram of portion "B" of FIG. 3.

Referring to FIG. 3 and FIG. 4, the present embodiment is basically the same as the first embodiment, the same points will not be repeated, and the differences are as follows.

The first fastening member 741 may include the first screw, the second fastening member 742 may include a second rivet, and the second rivet may be riveted in the valve core 72.

In other embodiments, the first fastening member 741 may include a first rivet, the second fastening member 742 may include the second screw, and the first rivet may be riveted in the valve core 72. Alternatively, the first fastening member 741 may include the first rivet, and the second fastening member 742 may include the second rivet.

A Third Embodiment

Figure 5:
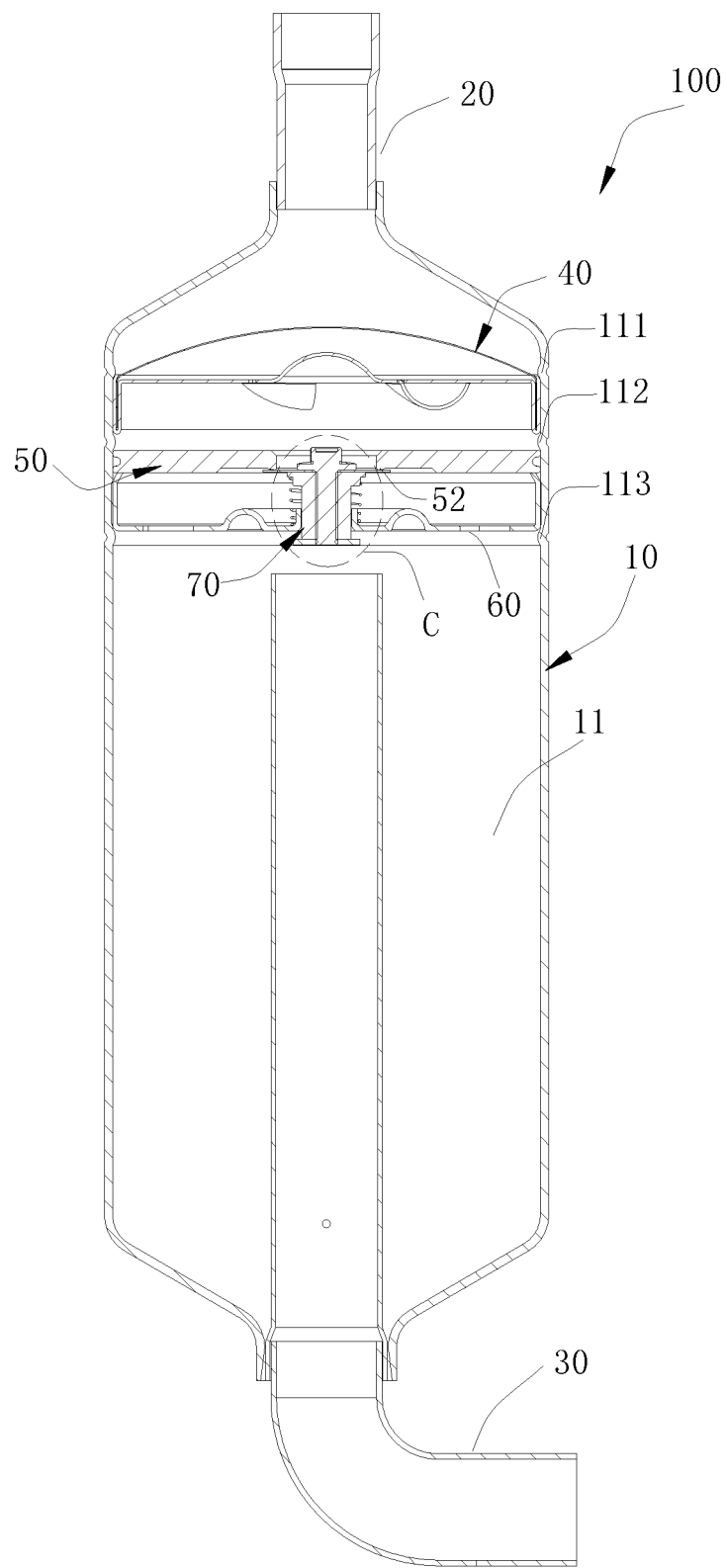
FIG. 5 is a schematic diagram of a liquid accumulator in a third embodiment of the present disclosure.
Figure 6:
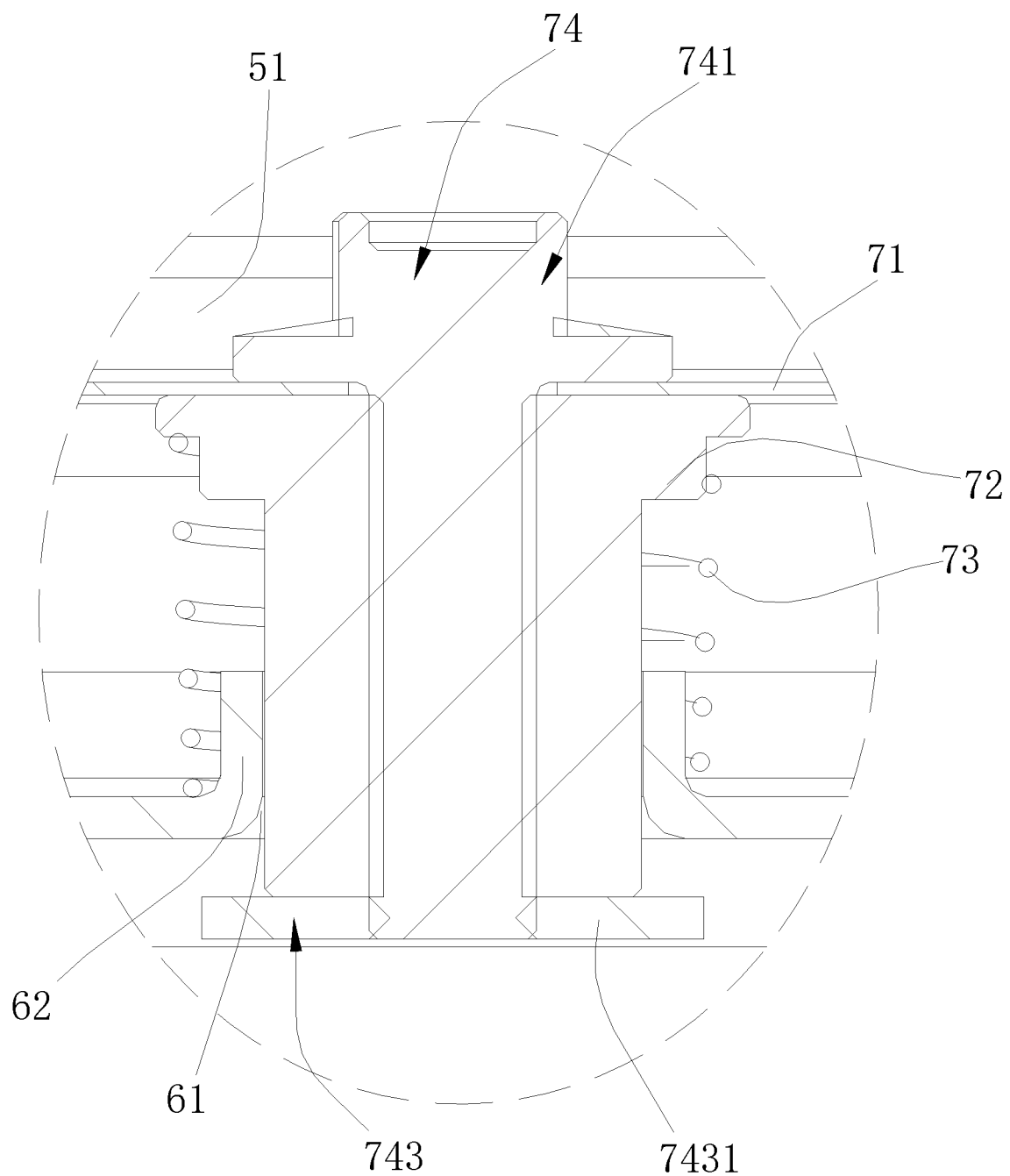
FIG. 6 is an enlargement diagram of portion "C" of FIG. 5.

Referring to FIG. 5 and FIG. 6, the blocking portion 74 may include a first fastening member 741 and a blocking member 743. The first fastening member 741 may penetrate through the valve core 72 and extend out of the valve core 72, the blocking member 743 may be disposed on an end surface of the valve core 72 that is away from the first fastening member 741, and the blocking member 743 may be connected to the first fastening member 741.

The first fastening member 741 may include a first screw, and the blocking member 743 may include a nut 7431. A part of the first screw extending out from the valve core 72 may be threadedably connected to the nut 7431. The nut 7431 may be matched with the first fastening member 741 to adjust the torque, and the nut 7431 has a low cost. In other embodiments, the first fastening member 741 may include a first rivet.

In the present embodiment, the first fastening member 741 may be proximal to the valve seat 50, and the first fastening member 741 may abut against the valve plate 71. The blocking member 743 may abut against the end surface of the valve core 72 that is away from the valve plate 71. Referring to FIG. 13 and FIG. 14, in other embodiments, the first fastening member 741 may be away from the valve seat 50, and the blocking member 743 may abut against the valve plate 71, the first fastening member 741 may abut against the end surface of the valve core 72 that is away from the valve plate 71.

After mounting of the valve seat 50, the one-way valve 70, and the baffle 60 is completed, the nut 7431 may be rotated to increase a torque greater than or equal to 2.5 Nm to fix the valve core 72.

A Fourth Embodiment

Figure 7:
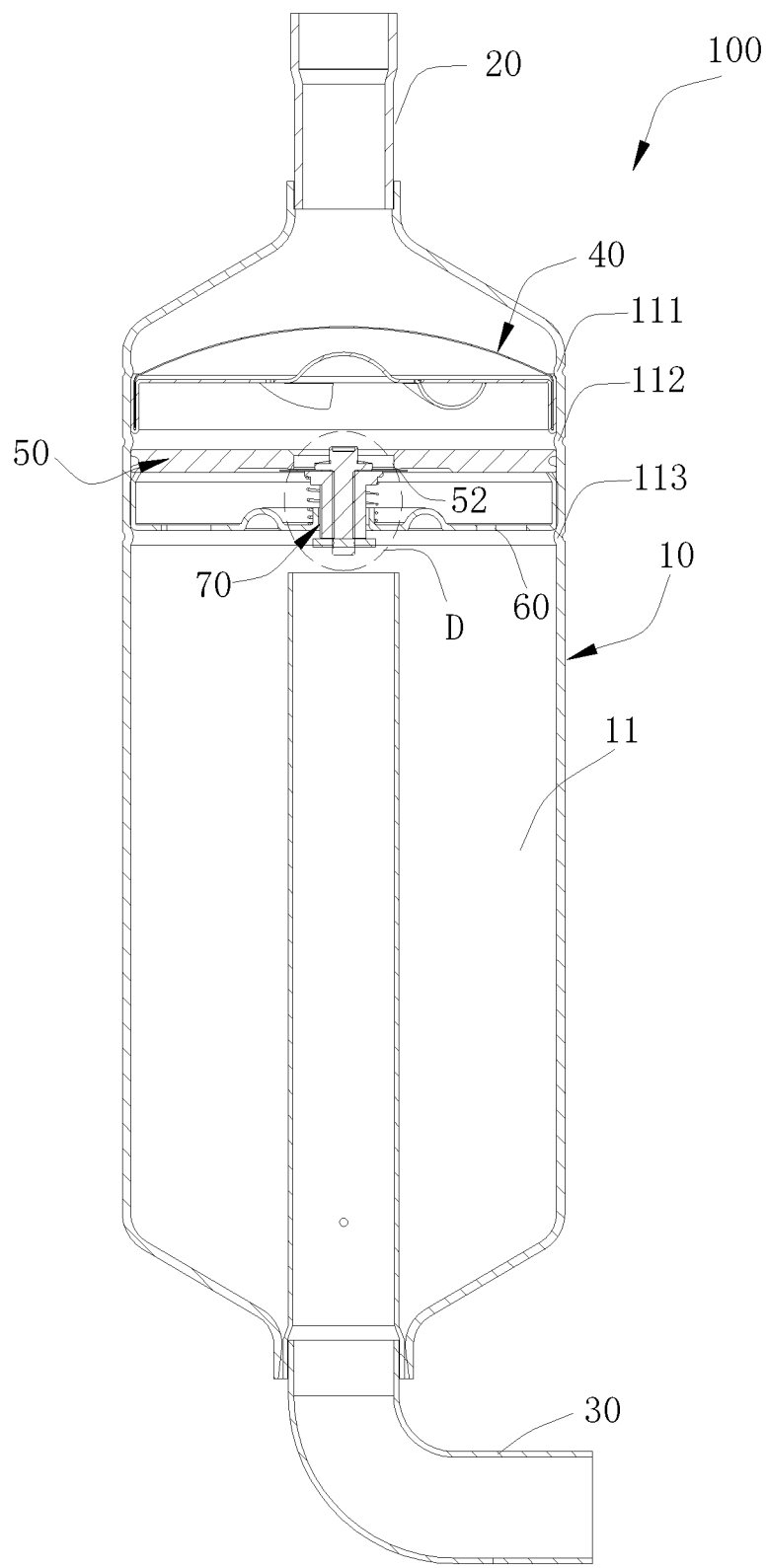
FIG. 7 is a schematic diagram of a liquid accumulator in a fourth embodiment of the present disclosure.
Figure 8:
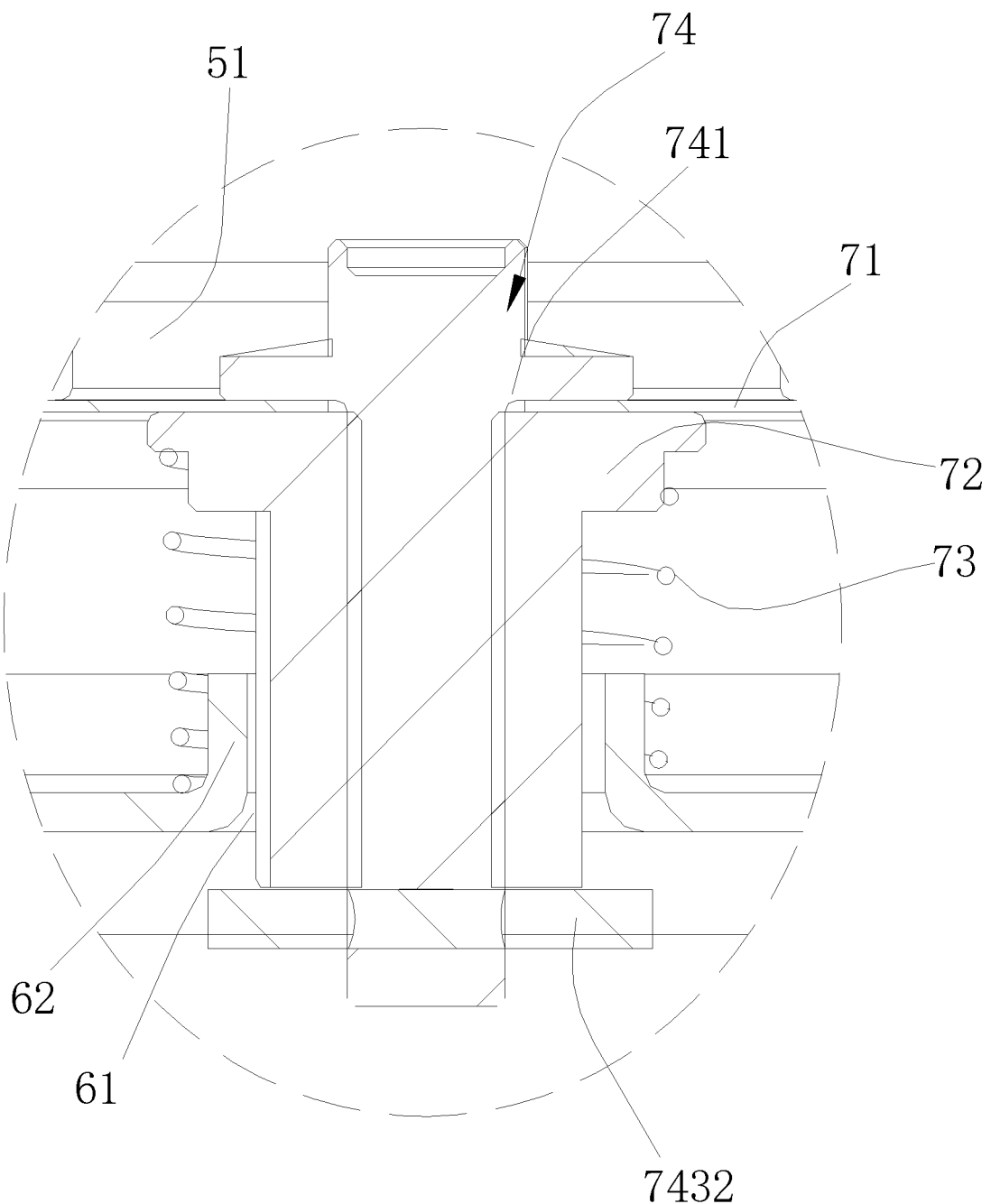
FIG. 8 is an enlargement diagram of portion "D" of FIG. 7.

Referring to FIG. 7 and FIG. 8, the present embodiment is basically the same as the third embodiment, the same points will not be repeated, and the differences are as follows.

The first fastening member 741 may include the first screw, the blocking member 743 may include a pin 7432, and the pin 7432 may penetrate through the part of the first screw extending out from the valve core 72. In other embodiments, the first fastening member 741 may include the first rivet.

A Fifth Embodiment

Figure 9:
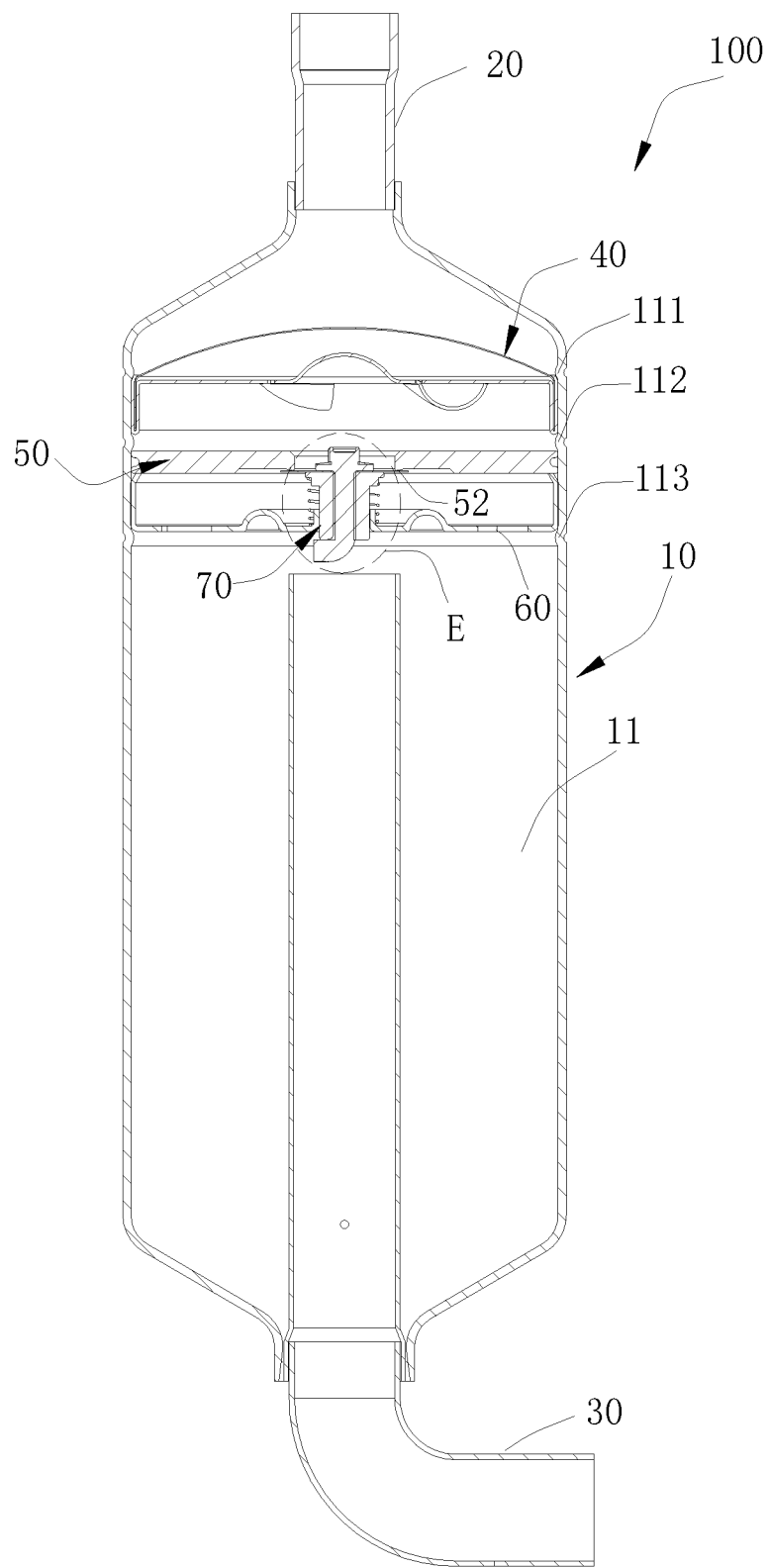
FIG. 9 is a schematic diagram of a liquid accumulator in a fifth embodiment of the present disclosure.
Figure 10:
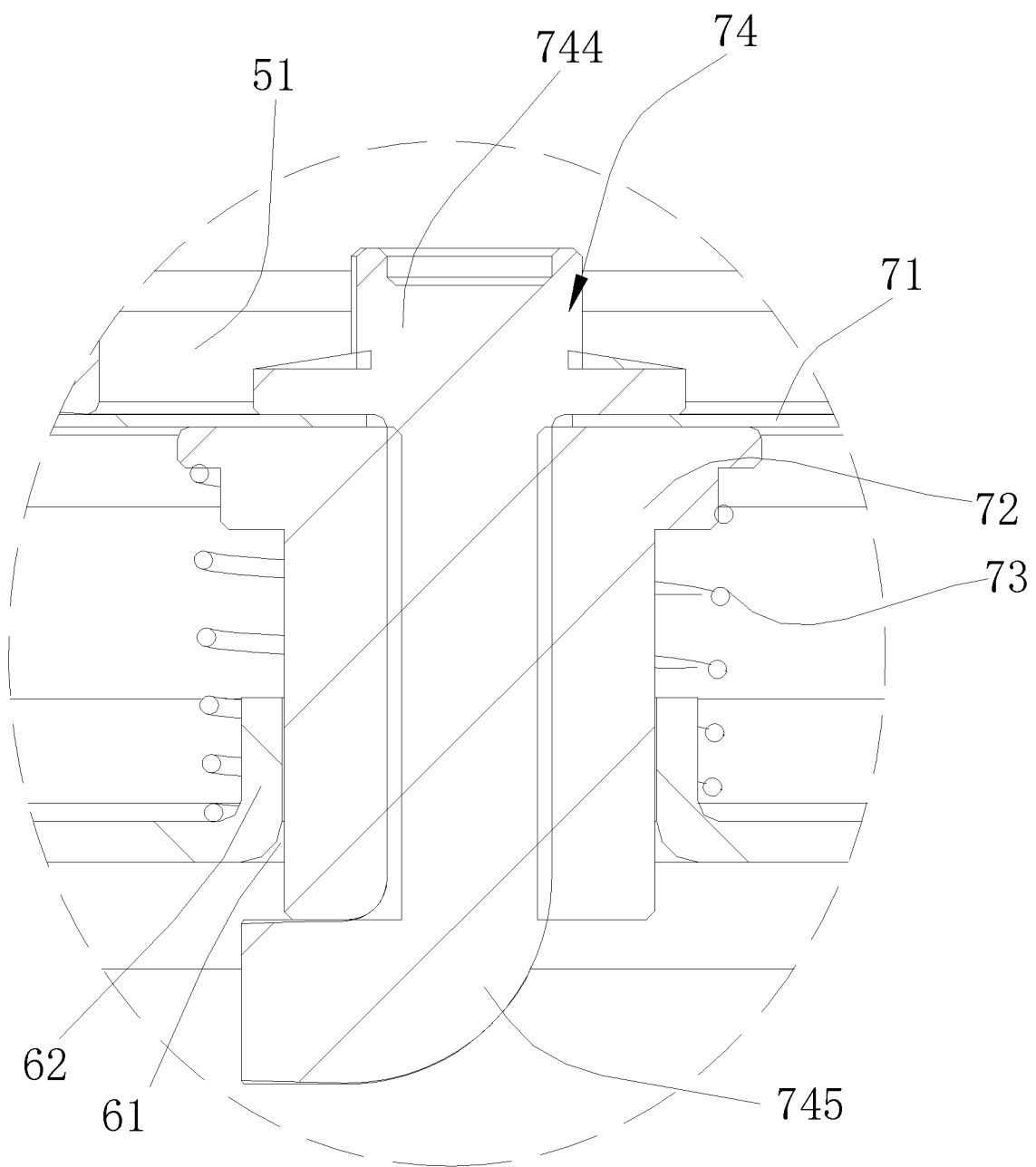
FIG. 10 is an enlargement diagram of portion "E" of FIG. 9.

Referring to FIG. 9 and FIG. 10, the blocking portion 74 may include a connecting section 744 and a bending section 745 connected with each other. A first end of the connecting section 744 may abut against the valve plate 71, a second end of the connecting section 744 may extend into the valve core 72 and be connected to the valve core 72, and the bending section 745 may abut against an end surface of the valve core 72 that is away from the connecting section 744.

In the present embodiment, the connecting section 744 may extend into the valve core 72 and be threadedably connected to the valve core 72, and the bending section 745 may be proximal to the baffle 60 and abut against the end surface of the valve core 72 that is away from the valve core 72. In other embodiments, the bending section 745 may be away from the baffle 6 and abut against the valve plate 71. In other embodiments, the connecting section 744 may be riveted in the valve core 72.

A Sixth Embodiment

Figure 11:
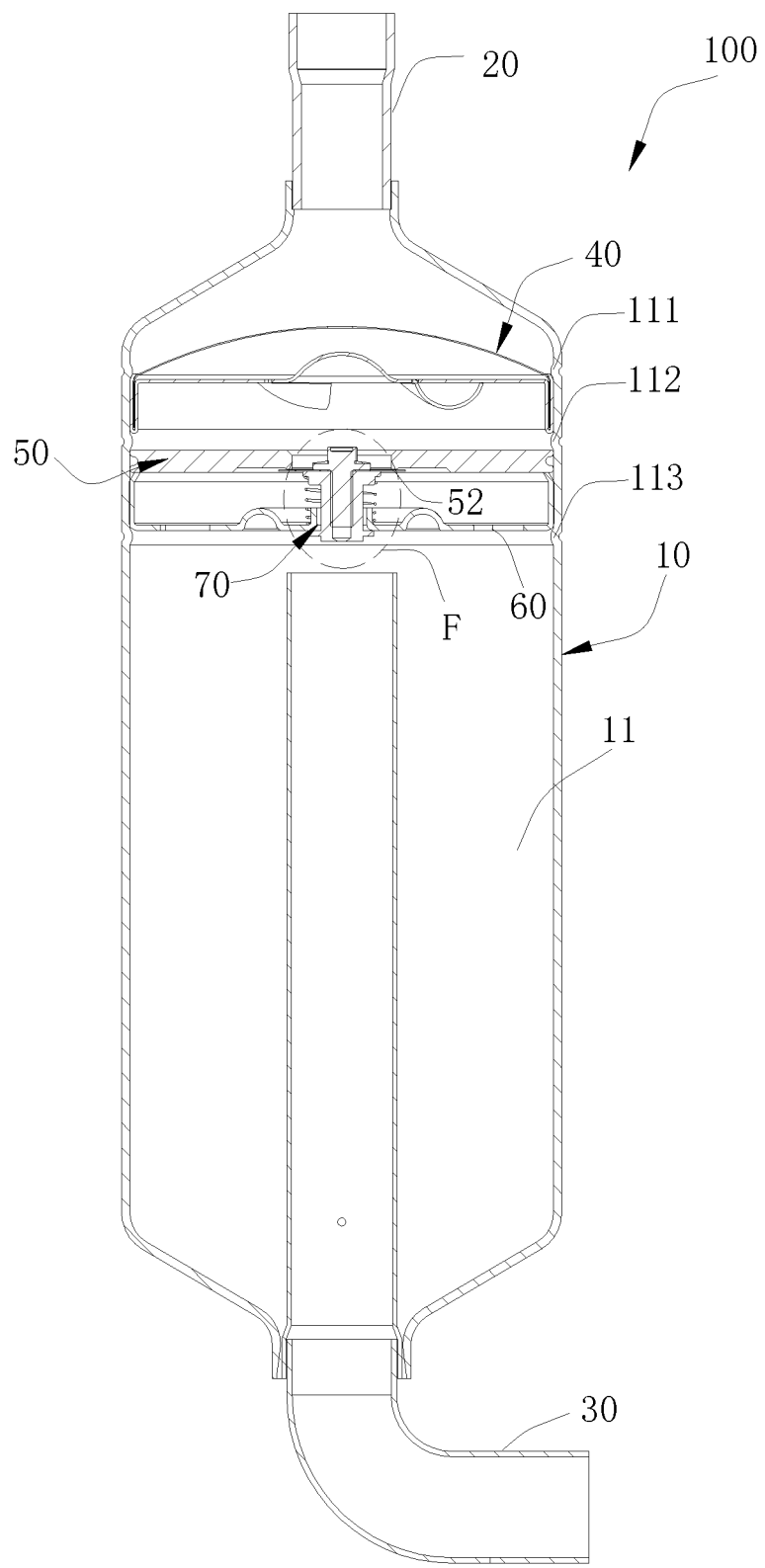
FIG. 11 is a schematic diagram of a liquid accumulator in a sixth embodiment of the present disclosure.
Figure 12:
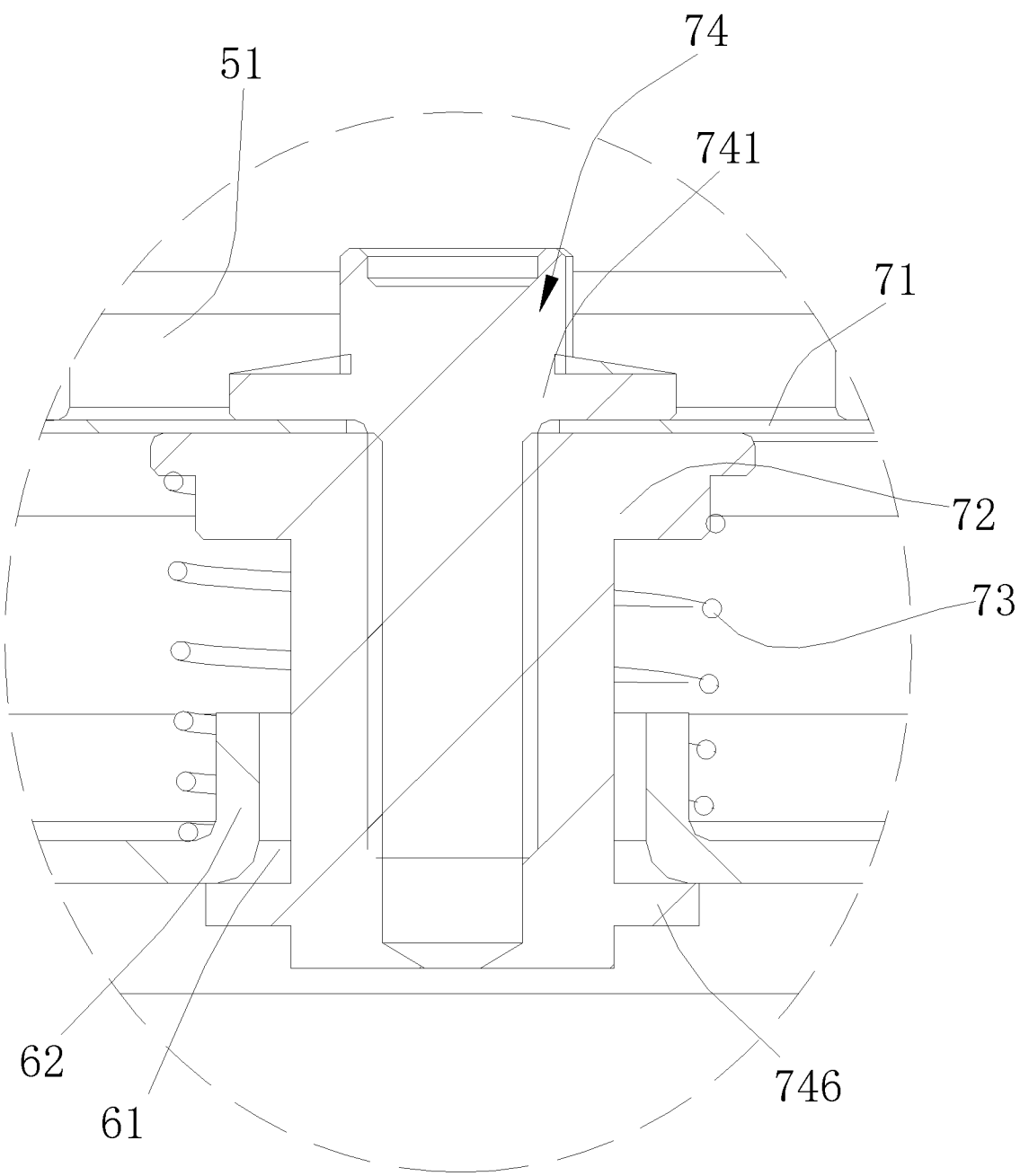
FIG. 12 is an enlargement diagram of portion "F" of FIG. 11.

Referring to FIG. 11 and FIG. 12, the blocking portion 74 may include a first fastening member 741 and a convex member 746. A first end of the first fastening member 741 may abut against the side surface of the valve plate 71 that is away from the baffle 60, and a second end of the first fastening member 741 may extend into the valve core 72 and be connected to the valve core 72.

Specifically, the first fastening member 741 may include a first screw, a first end of the first screw may abut against the side surface of the valve plate 71 that is away from the baffle 60, and a second end of the first screw may extend into the valve core 72 and be connected to the valve core 72. The convex member 746 may be disposed at an end of the valve core 72 that is away from the first fastening member 741, and the convex member 746 may abut against the baffle 60. The convex member 746 and the valve core 72 may be integrally formed. The valve core 72 may abut against the baffle 60 by the convex member 746, which may strengthen the stability of the valve core and strengthen coaxiality of the valve core 72, the valve port 51, and the communicating port 61. In other embodiments, the first fastening member 741 may include a first rivet. A first end of the first rivet may abut against the side surface of the valve plate 71 that is away from the baffle 60, and a second end of the first rivet may extend into the valve core 72 and be riveted in the valve core 72.

Figure 15:
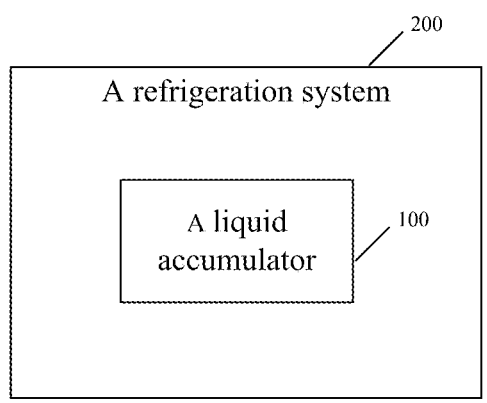
FIG. 15 is a schematic diagram of a refrigerating system in an embodiment of the present disclosure.

Referring to FIG. 15, the present disclosure further provides a refrigerating system 200, including the above liquid accumulator 100.

In an operation process of the refrigerating system 200, refrigerant may enter from the inlet pipe 20, gas-liquid mixed refrigerant may be filtered through the screen component 40, and a part of liquid refrigerant may be separated from gas refrigerant. Separated refrigerant may enter the valve port 51 and push down the valve core 72, the valve plate 71 may unblock the valve port 51, and the refrigerant may enter the baffle 60. The gas-liquid refrigerant may be separated from each other again by the blocking of the baffle 60, and the refrigerant may flow downward while the gas-liquid separation is carried out again. Liquid refrigerant may enter into a bottom of the tank body component 10, gaseous refrigerant may enter into the outlet pipe 30, and then into a compressor. When pressure of the refrigerant in the tank cavity 11 is higher, the valve core 72 may be reversed to push, the valve plate 71 may block the valve port 51, the refrigerant cannot be reversed to flow backward into the inlet pipe 20.

In a mounting process of the refrigerating system 200, the screen component 40 may be first disposed in the tank cavity 11, and the fourth protrusion 111 and the second protrusion 112 may be formed by pressure machining on an outer wall of the tank body component 10 to position the screen component 40. Then the valve seat 50 may abut against the second protrusion 112, and the one-way valve 70 may be mounted, then the baffle 60 may be mounted and abut against the valve seat 50. The third protrusion 113 may be formed by pressure machining on the outer wall of the tank body component 10 to position the baffle 60 for mounting.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. A liquid accumulator, comprising a tank body component, a valve seat, a baffle, and a one-way valve,
    wherein the tank body component has a tank cavity, and the valve seat and the baffle are arranged in the tank cavity and abut against a side wall of the tank cavity, respectively; the valve seat is provided with a valve port, and the baffle is provided with a communicating port; the one-way valve comprises a valve plate, a valve core, and a blocking portion connected to the valve core, the valve plate is arranged at an end of the one-way valve that is proximal to the valve port, the valve plate is capable of blocking the valve port, the valve plate abuts against the valve core, and an end of the valve core away from the valve plate passes through the communicating port;

a first end of the blocking portion abuts against a side surface of the valve plate that is away from the baffle and enables the valve core to connect to the valve plate; and a second end of the blocking portion either abuts against a side surface of the baffle that is away from the valve seat or penetrates through the valve core and abuts against an end surface of the valve core that is away from the valve plate.

2. The liquid accumulator of claim 1, wherein the blocking portion comprises a first fastening member and a second fastening member, a first end of the first fastening member abuts against the valve plate, and a second end of the first fastening member extends into the valve core and is connected to the valve core; a first end of the second fastening member abuts against an end surface of the valve core that is away from the first fastening member, and a second end of the second fastening member extends into the valve core and abuts against the first fastening member.

3. The liquid accumulator of claim 2, wherein the first fastening member comprises a first screw, and the first screw is threadedably connected to the valve core; or, the first fastening member comprises a first rivet, and the first rivet is riveted in the valve core; and the second fastening member comprises a second screw, and the second screw is threadedably connected to the valve core; or, the second fastening member comprises a second rivet, and the second rivet is riveted in the valve core.

4. The liquid accumulator of claim 1, wherein the blocking portion comprises a first fastening member and a blocking member, the first fastening member penetrates through the valve core and extends out of the valve core, the blocking member is disposed on an end surface of the valve core that is away from the first fastening member, and the blocking member is connected to the first fastening member.

5. The liquid accumulator of claim 4, wherein the blocking member comprises a nut or a pin.

6. The liquid accumulator of claim 1, wherein the blocking portion comprises a connecting section and a bending section connected with each other, a first end of the connecting section abuts against the valve plate, a second end of the connecting section extends into the valve core and is connected to the valve core, and the bending section abuts against an end surface of the valve core that is away from the connecting section.

7. The liquid accumulator of claim 1, wherein the blocking portion comprises a first fastening member and a convex member, a first end of the first fastening member abuts against the side surface of the valve plate that is away from the baffle, and a second end of the first fastening member extends into the valve core and is connected to the valve core; the convex member is disposed on an end of the valve core that is away from the first fastening member, and the convex member abuts against the baffle.

8. The liquid accumulator of claim 1, wherein a side surface of the valve seat is provided with a first protrusion, the side surface of the valve seat is proximal to the valve core, the first protrusion is proximal to and around the valve port, and the first protrusion abuts against the valve plate.

9. The liquid accumulator of claim 1, wherein the baffle is provided with a guide portion proximal to the valve core, the guide portion extends along an axial direction of the liquid accumulator, the communicating port is disposed on the guide portion, and the one-way valve is capable of moving along an axial direction of the guide portion to open or close the valve port.

10. A refrigerating system, comprising the liquid accumulator of claim 1.

* * * * *